E. L. LARISON.
PROCESS OF MAKING SULFURIC ACID.
APPLICATION FILED AUG. 25, 1919.
1,342,024.
Patented June 1, 1920.
2 SHEETS—SHEET 2.
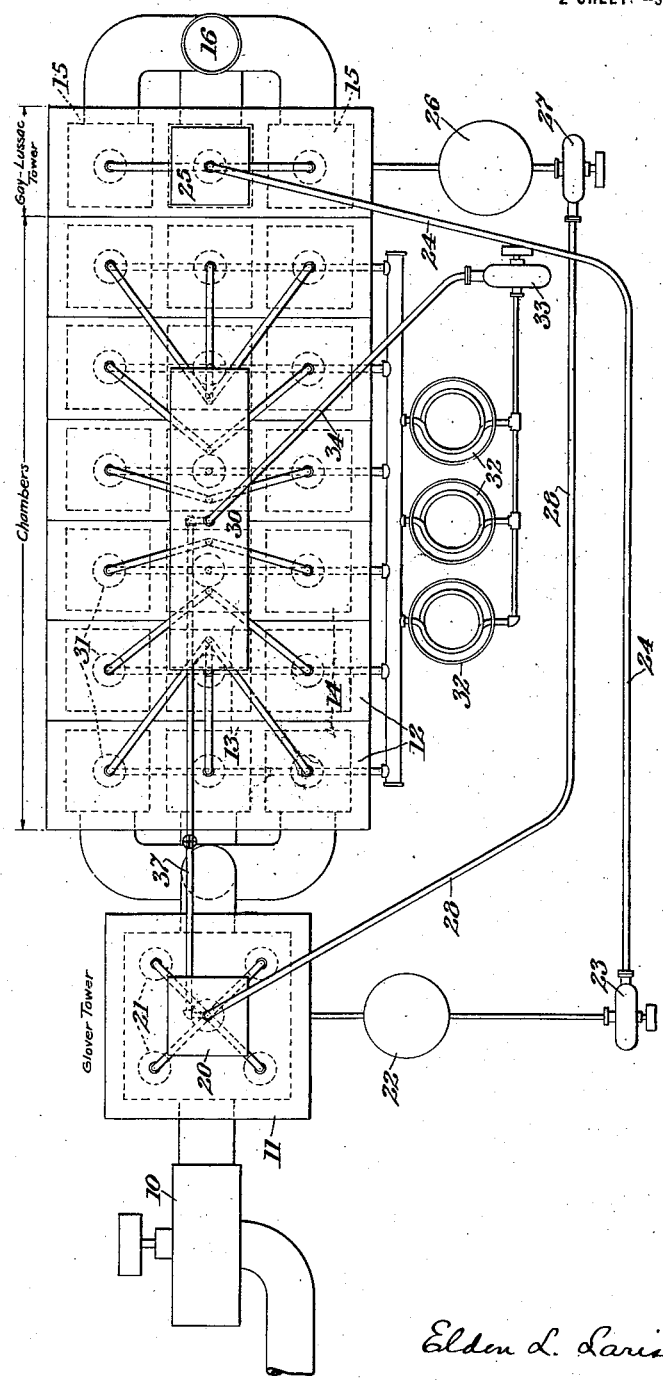
Inventor
Elden L. Larison
By Byrnes Townsend & Brickenstein
Attorneys

UNITED STATES PATENT OFFICE.

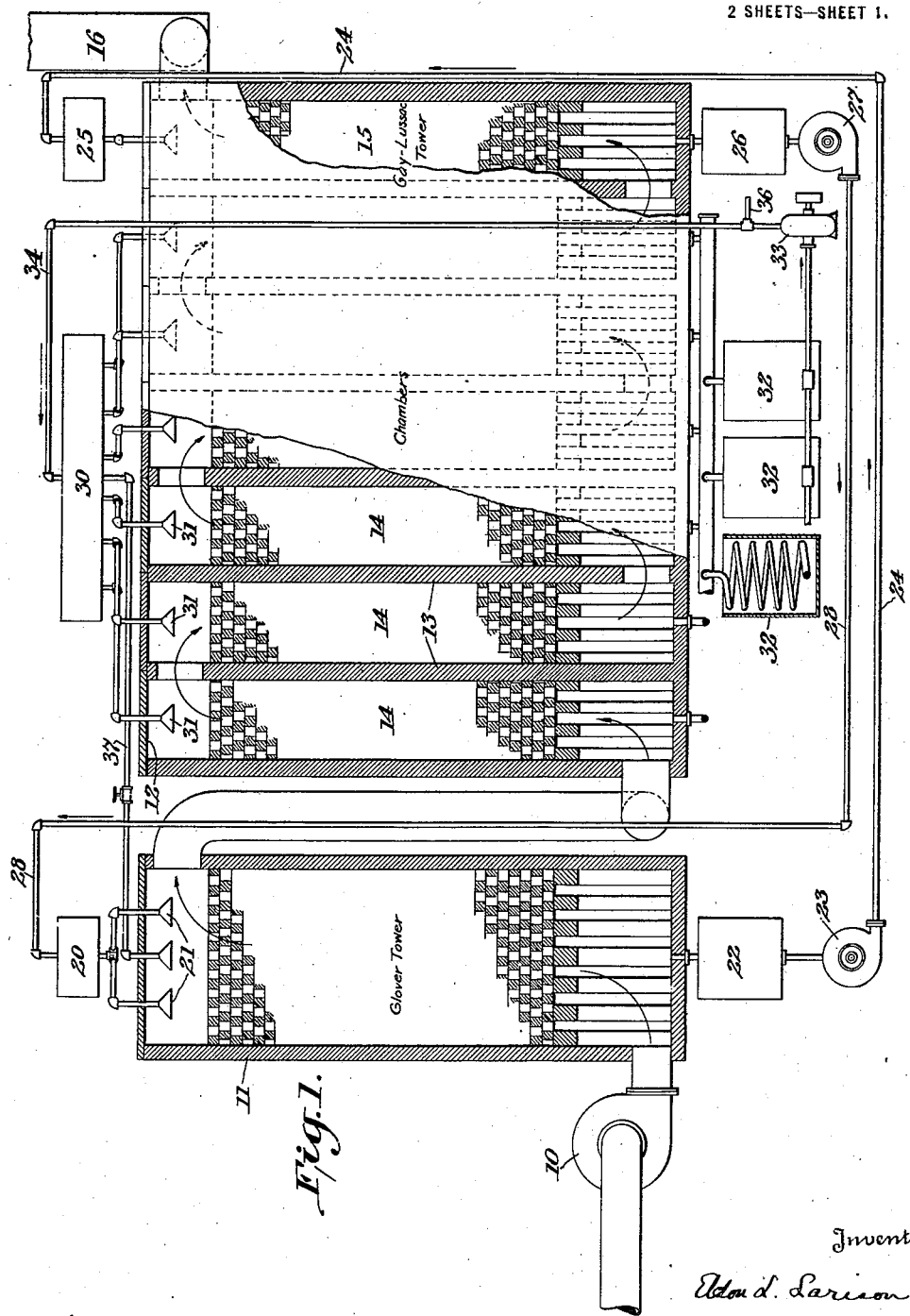

ELDON L. LARISON, OF ANACONDA, MONTANA.

PROCESS OF MAKING SULFURIC ACID.

1,342,024.   Specification of Letters Patent.   Patented June 1, 1920.

Application filed August 25, 1919. Serial No. 319.607.

*To all whom it may concern:*

Be it known that I, ELDON L. LARISON, a citizen of the United States, residing at Anaconda, in the county of Deerlodge and State of Montana, have invented certain new and useful Improvements in Processes of Making Sulfuric Acid, of which the following is a specification.

In the manufacture of sulfuric acid by the so-called chamber process, involving reactions between sulfur dioxid, oxids of nitrogen, oxygen and water, it has heretofore been customary to employ reaction chambers of lead. Lead has been used almost exclusively for this purpose because it is relatively cheap, it effectively resists the chemical action of the original reagents and intermediate and final reaction products, and finally because it is a good conductor of heat. The heat-conductivity of lead is an important factor in its use, because the acid-forming reactions generate a large amount of heat, and the ability to remove the excess heat of reaction is a limiting factor in the capacity of a set of lead chambers. In the usual lead chamber construction the excess heat must be dissipated by radiation, and since the radiating capacity of the chambers is practically a fixed quantity and can not be varied at will, a rather definite limit of production is set beyond which the chambers fail to function properly.

It has long been recognized that the reaction velocity in the chamber process could be increased by a vigorous mixing of the gases, causing them to impinge upon surfaces wet with acid. Various forms of construction have been used or proposed for use to utilize such effects; but with a construction involving lead as the chief acid-retaining material, the original plant costs and the increased maintenance costs have been such that little or no advantage has been secured as compared with the conventional chamber construction.

I have discovered a process of making sulfuric acid, without the necessity for lead chambers, whereby the acid making reactions take place with such intensity, rapidity and thoroughness that much greater proportions of the oxids of nitrogen can be employed than heretofore and many times as much acid produced in unit time as is at present possible with the lead chamber process.

In the lead-chamber process as carried out under present practices, the percentage of nitrous gas in the Glover tower mixture is substantially that derived from one part of sodium nitrate to every four parts of sulfur. In other words, for every four pounds of sulfur in the form of sulfur dioxid gas entering the Glover tower, an amount of nitrogen compound equivalent to one pound of sodium nitrate is introduced at the top of the tower. This is the established proportion for maximum acid-production. If the proportion of nitrous gas be exceeded to any substantial extent, no increased production of acid results, but increased loss of niter occurs. This limitation of the use of niter in ordinary chamber practice results from the fact that when radiation is chiefly depended on for temperature control, the temperature of the gas mixture in the first chamber rises too high for proper completion of the cycle of acid forming reactions if substantially more than the above mentioned proportion of niter is used. According to the present invention it is possible to employ from two to four times as much of the nitrogen oxids as can be used in the lead-chamber process.

In my process the optimum temperature for the reactions between the components of the gas mixture, viz. about 90° C., is maintained in not only the earlier parts of the packed reaction compartments but to a great extent in the later parts as well. In the lead chamber process the optimum temperature can be maintained to advantage in only the first one or two chambers while in the later chambers gradually decreasing and hence less favorable temperatures invariably exist.

The advantages of the foregoing conditions are obvious. The acid-forming reactions are accelerated to such an extent that the acid yield is many times that attainable under the best chamber practises. The sulfur dioxid is completely oxidized, and, despite the considerable increase in niter circulated, there is very little absolute increase in niter loss, while there is more than a proportional increase in the amount of acid produced.

According to the invention, the Glover tower gases containing the increased proportion of oxids of nitrogen are passed into chambers constructed of acid-proof masonry and so sub-divided internally by walls or partitions, preferably of the same material, that the gases are directed along an extended tortuous path, in the course of which they impinge upon the surfaces of acid-proof blocks, tiles or the like, with which the several compartments are wholly or partially filled. Optimum acid-making conditions are maintained in the compartments, and to assist in this, the heat of reaction is removed by continuous circulation of sulfuric acid maintained in the chamber at several points in the path of the gases, the temperature of the circulating acid being controlled by means of an external heat-exchanger through which the acid passes, and the concentration of the acid being maintained such as to avoid the absorption of material quantities of nitrogen compounds.

By proceeding in the manner described, employing for every two pounds of sulfur in the form of sulfur dioxid an amount of nitrogen compound equivalent to from one to two pounds of sodium nitrate, it has been found that the usual chamber reactions are accelerated about thirteen times.

The surprising result is due partly to the vigorous agitation to which the gases are subjected in encountering the innumerable obstructions in their path, partly to the fact that much larger proportions of niter may be used than heretofore, and partly to the fact that through the circulation of acid the optimum acid-making temperature is maintained in the packed chamber.

Whereas with the usual lead chamber operation the production capacity of any given set of chambers is limited by its radiating capacity, there is no such limit with the operation according to the present invention, since the excessive heat of reaction in the packed compartment is removed by the circulating acid and the rate of removal is dependent only upon the volume of acid circulated and its temperature. It is therefore possible to greatly intensify the reactions by introducing with the sulfur dioxid a much larger proportion, as previously stated, of the oxids of nitrogen than can be carried in the ordinary chambers on account of the temperature limitations of the latter. A further advantage is that the masonry construction employed is cheaper and more permanent than lead, and does not require buildings to protect it from the weather.

Suitable apparatus for carrying out my process is illustrated somewhat diagrammatically in the accompanying drawings, wherein:

Figure 1 is a central longitudinal section through a sulfuric acid system, including the Glover tower, the masonry chambers, and the Gay-Lussac tower, and Fig. 2 is a plan view of the same.

In said drawings, 10 indicates a blower receiving the dust-free gases containing sulfur dioxid, and introducing them into the Glover tower 11, which may be of standard construction. From the Glover tower the gases are delivered to the masonry chamber 12.

I preferably subdivide this chamber, by acid-proof masonry walls 13, into a multiplicity of vertical tower-like compartments 14, which may be substantially rectangular, and which communicate alternately at their upper and lower portions, whereby the gases are directed in a tortuous course indicated by the arrows in Fig. 1. Preferably the subdividing walls 13 are both longitudinally and transversely placed, the construction illustrated by way of example comprising a triple series of compartments, each series consisting of six interconnected compartments, or eighteen compartments in all. The compartments 15 adjacent the exit gas flue 16 may be of similar construction to the others, and may form a part of the general chamber construction; but they perform the functions of the Gay-Lussac tower.

The acid-circulating system through the Glover and Gay-Lussac towers comprises a distributing tank mounted above the Glover tower 11, and discharges the acid into the Glover tower through distributing heads 21. The acid flows from the tower into the collecting reservoir 22, and is conveyed by circulating pump 23 and pipes 24 to the distributing reservoir 25 for the Gay-Lussac towers 15. From the collecting reservoir 26 of the Gay-Lussac towers the acid is returned by circulating pump 27 and pipes 28 to the Glover tower distributing reservoir 20, thus completing the circuit.

An independent acid-circulating system is provided for the masonry chambers. As illustrated, this comprises a distributing reservoir 30 mounted above the compartments 14; one or more distributing heads 31 in each compartment; an external heat-exchanger illustrated as comprising three water-cooled units 32 for controlling the temperature of the effluent acid; and a circulating pump 33 serving to return the cooled acid by pipe 34 to the distributing reservoir 30.

The concentration of the circulating acid should be such as to avoid excessive absorption of the compounds of nitrogen, concentrations around 50° C. being suitable. The maintenance of the proper concentration involves the continuous or intermittent dilution of this acid, for example by the supply of water or dilute acid at any appropriate point in the circulating system. A corresponding volume of chamber acid is of course withdrawn from the system at any appropriate point, indicated for example at 36. The acid should be circulated in such volume and its temperature should be so controlled as to maintain the optimum working conditions within the chamber.

Means for supplying any desired quantity of chamber acid to the Glover tower are indicated at 37.

The apparatus referred to is not claimed in this application but is the subject of a prior application, Serial No. 254,794, filed September 19, 1918, of which the present application is a continuation in part.

I claim:

1. The process of making sulfuric acid, which comprises passing Glover-tower gases containing a mixture of oxids of sulfur and nitrogen substantially in the proportion derived from not less than one pound of sodium nitrate to each two pounds of sulfur, through a refractory-packed reaction-tower, maintaining the optimum acid-making temperature in the tower by circulation of acid of predetermined temperature, and then passing the sulfuric acid gases into a Gay-Lussac tower.

2. The process of making sulfuric acid, which comprises passing Glover-tower gases containing a mixture of oxids of sulfur and nitrogen substantially in the proportion derived from not less than one pound of sodium nitrate to each two pounds of sulfur, through a series of refractory-packed reaction-towers; maintaining the optimum acid-making temperatures in the towers by withdrawal of acid from the bottoms of the towers, adjusting the temperature of the acid and introducing the latter into the towers at their tops; and passing the sulfuric acid gases into a Gay-Lussac tower.

3. In the process of making sulfuric acid, the steps which consist in introducing into the gases in the Glover tower oxids of nitrogen substantially in the proportion derived from not less than one pound of sodium nitrate for each two pounds of sulfur as $SO_2$ present in the gas, passing the gas mixture so obtained through an extended course of refractory packing, and controlling the temperature in said course by passing cool acid therethrough.

4. In the process of making sulfuric acid, the steps which consist in introducing into the gases in the Glover tower oxids of nitrogen substantially in the proportion derived from not less than one pound of sodium nitrate for each two pounds of sulfur as $SO_2$ present in the gas, passing the gas mixture so obtained through an extended course of refractory packing, and controlling the reaction-temperature in said course by circulating acid of pre-determined temperature through the gas-stream at a plurality of points in said course.

5. In the process of making sulfuric acid, without the use of lead chambers, the steps which consist in passing the Glover tower gases through a series of refractory-packed reaction-units, introducing acid into the units at the tops thereof to absorb the heat of reaction of the acid-making, removing the accumulated reaction-heat from acid withdrawn from the bottoms of the units, diluting the cooled acid to a concentration sufficiently low to avoid excessive absorption of nitrogen compounds, and re-circulating the cooled and diluted acid.

6. In the process of making sulfuric acid, the steps which consist in introducing into the gases in the Glover tower oxids of nitrogen substantially in the proportion derived from not less than one pound of sodium nitrate for each two pounds of sulfur as $SO_2$ present in the gas, passing the gas mixture so obtained through a series of refractory-packed reaction-units, introducing acid into the units at the tops thereof to absorb the heat of reaction of the acid-making, removing the accumulated reaction-heat from acid withdrawn from the bottoms of the units, diluting the cooled acid to a concentration sufficiently low to avoid excessive absorption of nitrogen compounds, and re-circulating the diluted acid.

7. The process of making sulfuric acid which comprises introducing into the gases in the Glover tower oxids of nitrogen substantially in the proportion derived from not less than one pound of sodium nitrate for each two pounds of sulfur as $SO_2$ present in the gas, passing the gas mixture so obtained through an extended course of refractory-packing, controlling the temperature in said course by passing cool acid therethrough, and recovering for re-use the oxids of nitrogen in the effluent gas.

8. In the process of making sulfuric acid without the use of lead chambers, the steps which consist in passing the Glover tower gases through a series of refractory-packed reaction-towers, maintaining optimum acid-making temperatures in the towers by circulation of weak acid, and substantially completely oxidizing the sulfur dioxid in the reaction-towers.

9. In the process of making sulfuric acid without the use of lead chambers, the steps which consist in passing the Glover tower gases through an extended course of refractory packing, and maintaining a temperature of substantially not less than 90° C. in the packing by circulation therethrough of acid of regulated temperature.

10. In the process of making sulfuric acid, the steps which consist in introducing into the gases in the Glover tower oxids of nitrogen substantially in the proportion derived from not less than one pound of sodium nitrate for each two pounds of sulfur as $SO_2$ present in the gas, passing the gas mixture so obtained through an extended course of refractory-packing, and maintaining therein a temperature of substantially not less than 90° C. by circulation therethrough of acid of regulated temperature.

In testimony whereof, I affix my signature.

ELDON L. LARISON.